Dec. 23, 1952 A. B. SMITH 2,622,644
FRUIT JUICE EXTRACTOR
Filed May 15, 1948 2 SHEETS—SHEET 1
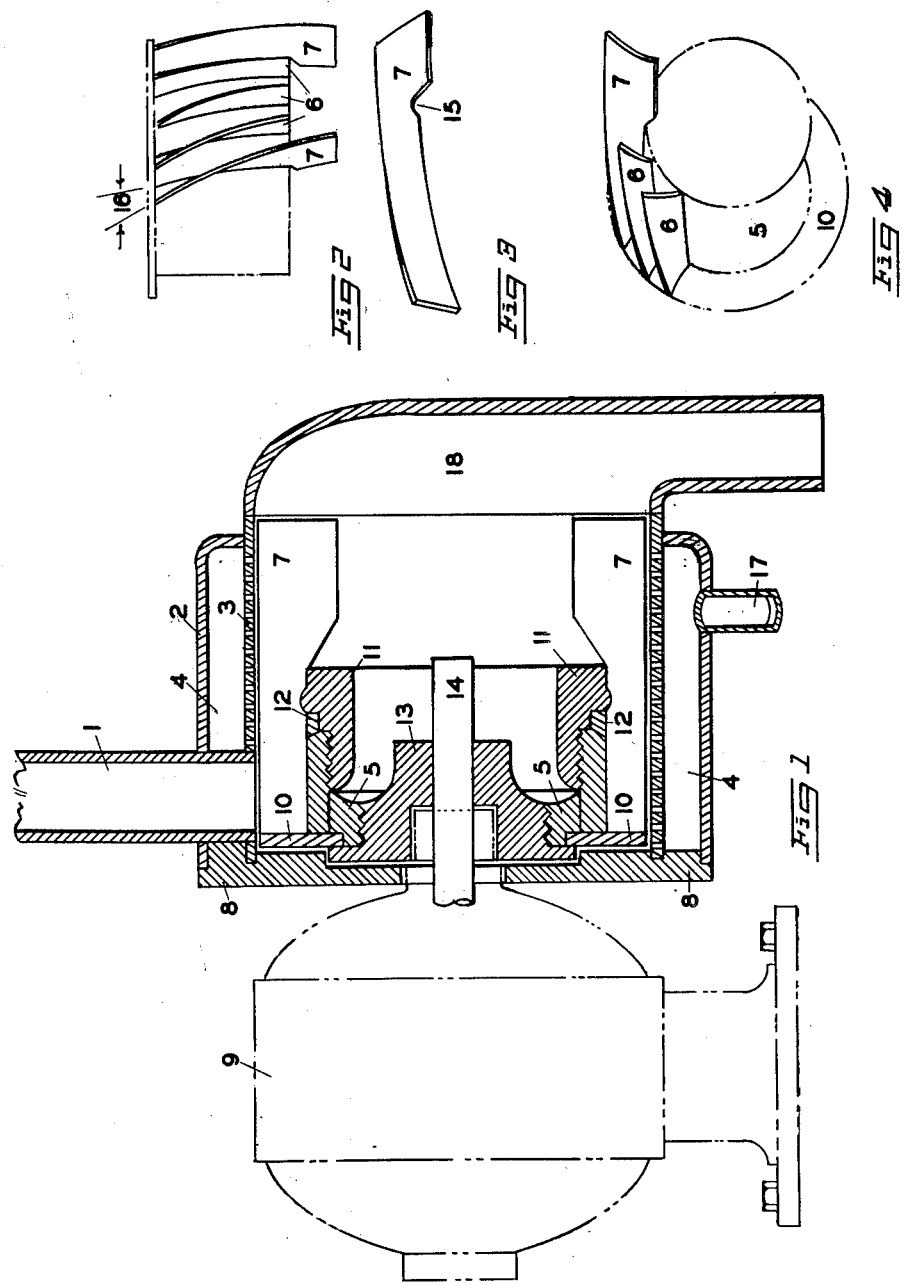
INVENTOR
Adam Ballantyne Smith Dec. 23, 1952     A. B. SMITH     2,622,644
FRUIT JUICE EXTRACTOR
Filed May 15, 1948     2 SHEETS—SHEET 2
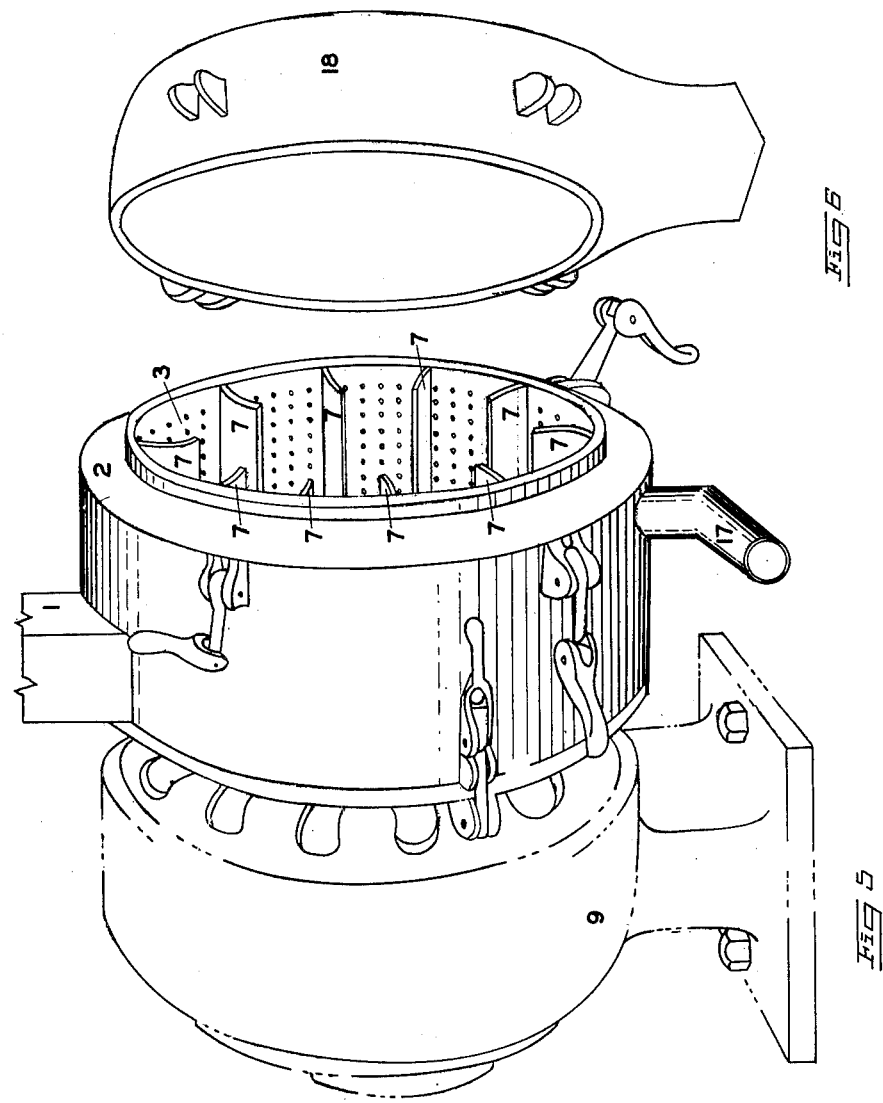
INVENTOR
Adam Ballantyne Smith Patented Dec. 23, 1952

2,622,644

UNITED STATES PATENT OFFICE 2,622,644

FRUIT JUICE EXTRACTOR

Adam Ballantyne Smith, Edmonton, Alberta, Canada

Application May 15, 1948, Serial No. 27,349
In Canada February 18, 1948

1 Claim. (Cl. 146—76)

The object of my invention is the provision of a mechanism which will extract or press the juice from fruits, raw vegetables or roots and will separate the juice from the pulp or from the pulp and fibre. The mechanism I have designed accomplishes this object with greater efficiency and more speed than do any existing machines designed for this purpose.

Of the various types of fruit juice extractors presently in use, all have notable disadvantages. Many of them use a heavy and unwieldy mechanism. Other types are inefficient in that a large portion of the juice is not extracted from the fruit or vegetable. The greater number of fruit juice extractors, however, are inefficient in the lack of separation of the small bits of pulp from the juice which is recovered.

My invention provides a comparatively light machine which may be operated by hand or by power. The extraction and separation of the juice from the pulp and fibre is thorough and complete, with the result that the extracted juice is perfectly clear.

The operation of the device may best be understood by reference to the attached drawings in which:

Figure 1 is a side sectional elevation of the device with the location of the source of power indicated in phantom lines.

Figure 2 is a diagrammatic view of the rotor and four blades revealing the varying angle of each blade and the varying lengths of different blades.

Figure 3 is a side view of a blade detached from the assembly.

Figure 4 is an additional view of the blade indicating how it is fitted on the rotor, which is shown in phantom lines.

Figure 5 is a general perspective view of the assembly with the pulp dump detached.

Figure 6 is a perspective view of the pulp dump.

In Figures 1 and 5, 1 is the hopper through which the whole fruit or vegetable is introduced into the extractor. 2 is the outer casing of the extractor with which is assembled a perforated colander 3. The space between the outer casing 2 and the colander 3 forms a chamber 4.

Rotatably mounted on a horizontal axis and within the casing and colander assembly is a rotor 5 upon which is mounted a series of helically arranged blades 6 and 7. It will be noted, particularly in Figures 2 and 4, that every fourth blade 7 is longer than the three intervening blades 6, 6.

A mounting plate 8 is firmly secured to the hub of the motor 9 which enables the extractor to be assembled with the motor 9 or mounted upon it.

The rotor 5 is assembled with the blades 6 and 7 and the backing ring 10, as shown in Figure 4. The peculiar shape of the blades 6 and 7 can be seen from Figure 2 and Figure 3. The locking ring 12 is slipped over the closer 11 which is then screwed into the rotor 5. The hub nut 13 is then screwed over the backing ring 10 and the resultant unit is then threaded onto the motor spindle extension 14. The helical blades 6 and 7 are set into the grooves in the rotor 5 and are held in place by the locking ring 12 which is contained by the notch 15. The hub nut 13 is flattened on two sides to facilitate tightening with a wrench.

The outer casing 2 with the colander 3 is secured to the mounting plate 8 by means of any suitable clamping device.

In order to produce maximum efficiency in the operation of the blades 6 and 7, they are so shaped that at the hopper end of the rotor the flat plane of the blade inclines at an angle toward the direction of rotation of the rotor 5 and at the opposite end at any angle away from the direction of rotation of the rotor 5. This variation in angle is indicated by the angle 16 in Figure 2. In addition the edge of each blade is suitably ground, to provide a keen cutting edge in the direction of rotation of the rotor 5.

In operation, the fruit from which the juice is to be extracted is inserted in the feed hopper 1. The rotation of the sharpened helical blades 6 and 7 cuts the fruit into wafer-thin slices and subjects the wafer-thin slices to centrifugal force to extract most of the juice. The continued rotation of the blades reduces the wafer-thin slices to a wet pulp.

The rotation of the blades 6 and 7 squeezes the pulped fruit against the holes in the colander 3. The juices are forced through the holes into the chamber 4 and are drained off through a suitable catch pipe 17.

Due to the helical shape of the blades 6 and 7 the pulp itself will move along the blades and the top of the rotor 5 in a direction away from the hopper 1 and will eventually be deposited in the pulp dump 18 from which it can drop into any suitable receptacle.

The fact that every fourth blade 7 extends well past the ends of the remaining blades 6 and the end of the rotor 5 provides a "fanning" effect, which tends to blow the pulp clear of the rotor and blades and into the pulp dump 18. This ensures a much more complete separation of the pulp from the juice than would otherwise be obtained. It also ensures that the operation is clean, avoiding the necessity, present in many types of fruit juice extractors, of frequent dismantling and cleaning during the operation due to clogging of the mechanism by the pulp. The action described is not that of forcing the juice through the holes in the colander 3 by the blowing action but rather the action of blowing the unwanted pulp clear of the rotor and blades into the pulp dump 18.

After use, the device is easily dismantled for cleaning by undoing the clamps, permitting the pulp dump 18 to be removed from the outer casing 2 and the assembly included within the outer casing 2 to be removed from the mounting plate 8.

In the example shown an electric motor is fitted to provide the necessary motive power. The same device could be fitted with a crank or handle to provide for the application of hand power. Also in the example shown, every fourth blade is longer than the remaining three. The proportion of long blades to short may be varied, depending upon the size of the machine used.

What I claim as my invention is:

A device for separating the juices from fruits, vegetables and roots comprising a rotor rotatably mounted on a horizontal axis; a series of helically arranged blades mounted on the said rotor, the flat plane of the said blades inclined at an angle towards the direction of rotation of the said rotor at one end of the said blades and at an angle away from the direction of rotation at the other end of the said blades, every fourth blade of the said blades being longer than the previous three of the said blades, the longer blades extending well past one of the ends of the said rotor and the shorter blades being substantially of the same length as the said rotor; all of such blades being suitably ground to provide a cutting edge in the direction of rotation of the said rotor; a cylindrical colander co-axial with the said rotor in which the said blades may rotate with the said rotor and being open as to the end adjacent to the said longer blades; a hopper member leading into the upper side of the said colander adjacent to the end of the said rotor at which the plane of the said blades is inclined at an angle in the direction of rotation of the said rotor; an outer casing containing the said assembly and forming a chamber outside the colander; outlet means for the said chamber; an additional chamber positioned to enclose the longer blades of the said series of helically arranged blades and adapted to discharge material received from the said longer blades; means for rotating the said rotor assembly.

ADAM BALLANTYNE SMITH.

REFERENCES CITED

The following references are of record in the file of this patent:

UNITED STATES PATENTS

| Number | Name | Date |
|---|---|---|
| 142,897 | Brownback | Sept. 16, 1873 |
| 384,299 | Way | June 12, 1888 |
| 1,848,225 | Schmidt | Mar. 8, 1932 |
| 2,315,028 | Thomas | Mar. 30, 1943 |
| 2,322,306 | McLaren | June 22, 1943 |
| 2,325,006 | Crawford | July 20, 1943 |
| 2,345,683 | Owens | Apr. 4, 1944 |
| 2,435,030 | Brady | Jan. 27, 1948 |

FOREIGN PATENTS

| Number | Country | Date |
|---|---|---|
| 472,285 | Germany | Feb. 25, 1929 |
| 670,056 | Germany | Jan. 11, 1939 |